United States Patent Office 3,294,819
Patented Dec. 27, 1966

3,294,819
SYNTHESIS OF STEROIDS
Gerald W. Krakower, Elizabeth, and Hilda Van Dine, Princeton, N.J., assignors to E. R. Squibb & Sons, Inc., New York, N.Y., a corporation of Delaware
No Drawing. Filed Feb. 10, 1966, Ser. No. 526,338
15 Claims. (Cl. 260—343.2)

This invention is a continuation-in-part of copending application, Serial No. 419,231, filed December 17, 1964, now abandoned.

This invention relates to and has as its object the provision of new physiologically active steroids, novel methods for their production and new intermediates useful in said preparation. More particularly, this invention relates to the preparation of compounds of the formula

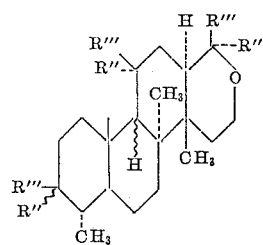

wherein $R'''$ is hydrogen; $R''$ is hydroxy or acyloxy; and together $R''$ and $R'''$ is oxo (O=).

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

[Whenever in this application and the claims appended thereto, a curved line (∫) is employed in the formulae, it is meant to denote that the connected atom may be either in the alpha or beta position.]

The final products of this invention are physiologically active steroids which possess uterotrophic activity and may be used in the treatment of such conditions as menstrual disorders, being formulated for such administration in the manner and/or dosage as determined by the respective compound involved and the requirements of the patient.

The final compounds of this invention may be prepared according to the processes of this invention which may be represented by the following equations wherein $R''$ and $R'''$ are as hereinbefore defined and X may be hydrogen, Y may be hydroxy or acyloxy, and together X and Y is oxo (O=):

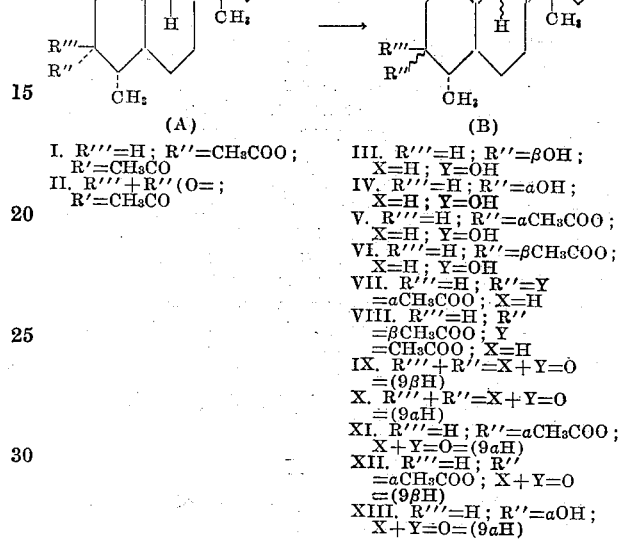

In the first step of the novel process of this invention, the starting materials (Compounds A) are reduced as by treatment with a reducing agent, for example, an alkali metal borohydride, such as sodium borohydride, to yield the 11-hydroxy-16 unsubstituted derivatives thereof. The starting materials (Compounds A) which may be employed in the practice of this invention may be prepared by alkylation of the starting materials' corresponding acid to form 21-ester derivatives thereof and treating the ester with ozone to yield the D-ring lactol starting materials of this invention. The disclosure for the preparation of these starting materials is more fully set forth in a prior application, Serial No. 397,015, filed September 16, 1964, in the names of Gerald W. Krakower and Patrick A. Diassi.

In order to obtain the novel 11-acylated compounds of this invention (Compounds B, VII and VIII), the corresponding 11-hydroxylated compounds may be acylated under acidic conditions, as by treatment with an acid, acid anhydride and toluene sulfonic acid. The 3-hydroxy compounds (Compounds B, III and IV) may be mono-acylated as by treatment with an acylating agent, for example, acid anhydride or acyl halide, in the presence of an organic base, such as collidine or pyridine, to yield the 3-acylated derivatives (Compounds B), which are also new compounds of the instant invention.

The 3,11-disubstituted compounds may then be oxidized, as by treatment with an oxidizing agent, for example, chromic acid to yield the 3,11-diketo derivatives (Compounds B), which are new compounds of the instant invention.

In order to obtain the 9α-epimer of the 9β,11-keto derivatives (e.g., Compounds B, IX), the 9β,11-keto compounds are treated with an alcoholic base, for example, ethanolic potassium hydroxide under elevated temperatures to yield the 9β-epimer (e.g., Compounds B, X), which are also new compounds of this invention.

It has also been found when the starting material (Compounds B, X) is reduced as by treatment with a reducing agent as exemplified hereinabove, the 3β,17α-dihydroxy and the 3β-hydroxy compounds of this invention are formed. This compound may be acylated in the manner hereinabove set forth.

The invention may be further illustrated by the following examples:

EXAMPLE 1

*3α - acetoxy - 11α - hydroxy - 4α,8,14 - trimethyl - 17 - oxa-D-homo-18-nor - 5α,8α,9β,13α,14β-androstane-17a-one*

A suspension of 250 mg. of 3α,16β - diacetoxy - 4α,8,14 - trimethyl - 17 - oxa - D - homo - 18 - nor - 5α,8α,9β,13α,14β - androstane 11,17a - dione in 25 ml. of absolute ethanol is treated with 125 mg. of sodium borohydride and stirred at room temperature. After ten minutes the substrate dissolves and after seventy-five minutes the reaction mixture is acidified with glacial acetic acid. The solvent is evaporated and the residue is taken up in ethyl acetate. After washing with saturated salt solution, drying and evaporation of the solvent, 210 mg. of crystalline material is obtained. Two recrystallizations from methanol give 84 mg. of analytically pure 3α-acetoxy-11α-hydroxy - 4α,8,14 - trimethyl - 17 - oxa - D - homo - 18 - nor - 5α,8α,9β,13α,14β - androstane - 17a - one, M.P. 209–212° C., $[α]_D^{31}$ —55.5°.

*Analysis.*—Calc'd for $C_{23}H_{36}O_5$: C, 70.37; H, 9.24. Found: C, 70.00; H, 9.66.

EXAMPLE 2

*3α - acetoxy - 4α,8,14 - trimethyl - 17 - oxa - D - homo-18-nor-5α,8β,9α,13α,14β-androstane-11,17a-dione*

A solution of 48 mg. of 3α - acetoxy - 11α - hydroxy-4α,8,14 - trimethyl - 17 - oxa - D - homo - 18 - nor-5α,8α,9β,13α,14β - androstane - 17a - one in 2 ml. of acetone is treated with an excess of chromic acid-sulfuric acid reagent. After five minutes at room temperature the excess chromic acid is reduced with methanol and the solution diluted with water. The solvent is evaporated and the aqueous suspension is extracted with methylene chloride. The methylene chloride solution is washed with saturated salt solution, dried and evaporated to give 34 mg. of material. Recrystallization from methanol gives 20 mg. of 3α - acetoxy - 4α,8,14 - trimethyl - 17-oxa - D - homo - 18 - nor - 5α,8α,9β,13α,14β - androstane-11,17a-dione, M.P. 214–215° C., $[α]_D^{32}$ —9.4°.

*Analysis.*—Calc'd for $C_{23}H_{34}O_5$: C, 70.74; H, 8.78. Found: C, 70.78; H, 8.74.

EXAMPLE 3

*3β - 11α - dihydroxy - 4α,8,14 - trimethyl - 17 - oxa - D-homo - 18 - nor - 5α,8α,9β,13α,14β - androstane - 17a-one*

A suspension of 400 mg. of 16β - acetoxy - 4α,8,14-trimethyl - 17-oxa-D-homo-18-nor - 5α,8a,9β,13α,14β-androstane - 3,11,17a-trione in 40 ml. of absolute ethanol is treated with 300 mg. of sodium borohydride and stirred at room temperature for three hours. The reaction is then worked up as described in Example 1 to give 373 mg. of crude 3β,11α - dihydroxy - 4α,8,14 - trimethyl-17 - oxa - D-homo - 18 - nor - 5α,8α,9β,13α,14β - androstane - 17a - one. Recrystallization from methanol gives 79 mg., M.P. 279–284° C. The analytical sample has M.P. 283–284° C.

*Analysis.*—Calc'd for $C_{21}H_{34}O_4$: C, 71.96; H, 9.78. Found: C, 72.00; H, 9.60.

EXAMPLE 4

*4α,8,14 - trimethyl - 17 - oxa - D - homo - 18 - nor - 5α, 8α,9β,13α,14β-androstane-3,11,17a-trione*

An excess of chromic acid-sulfuric acid reagent is added to a solution of 254 mg. of crude 3β,11α-dihydroxy - 4α,8,14 - trimethyl - 17 - oxa - D - homo - 18-nor - 5α,8α,9β,13α,14β - androstane - 17a - one in 15 ml. of acetone. After fifteen minutes at room temperature, methanol is added to reduce the excess chromic acid and the reaction is worked up as described in Example 2. The 213 mg. of crude 4α,8,14-trimethyl-17-oxa-D-homo-18-nor - 5α,8α,9β,13α,14β-androstane-3,11, 17a-trione obtained is recrystallized from methanol to give a first crop of 94 mg., M.P. 257–260° C. and a second crop of 47 mg., M.P. 246–250° C., $[α]_D^{29}$ +103°.

*Analysis.*—Calc'd for $C_{21}H_{30}O_4$: C, 72.80; H, 8.73. Found: C, 72.94; H, 8.66.

EXAMPLE 5

*3α - 11α - dihydroxy - 4α,8,14 - trimethyl - 17 - oxa - D-homo - 18 - nor - 5α,8α,9β,13α,14β - androstane-17-one*

A solution of 81 mg. of 3α - acetoxy - 11α - hydroxy-4α,8,14 - trimethyl - 17 - oxa - D - homo - 18 - nor-5α,8α,9β,13α - 14β - androstane - 17a - one, in 25 ml. of 5% ethanolic potassium hydroxide is left overnight at room temperature. The solution is then acidified with 20% sulfuric acid, diluted with water and the solvent evaporated. The aqueous suspension is extracted with ethyl acetate and washed with saturated salt solution, dried and evaporated to give 73 mg. of crude 3α,11α-dihydroxy - 4α,8,14 - trimethyl - 17 - oxa - D - homo-18 - nor - 5α,8α,9β,13α,14β - androstane - 17a - one.

EXAMPLE 6

*4α,8,14 - trimethyl - 17 - oxa - D - homo - 18 - nor - 5α, 8α,9β,13α,14β-androstane-3,11,17a-trione*

Oxidation of 46 mg. of the material of Example 5 with chromic acid-sulfuric acid as described in Example 2 gives 42 mg. of crude 4α,8,14 - trimethyl - 17 - oxa - D-homo - 18 - nor - 5α,8α,9β,13α,14β - androstane - 3,11, 17a - trione, which on recrystallization from methanol has M.P. 255–258° C. and an infrared spectrum (Nujol) identical with that of the material obtained in Example 4.

EXAMPLE 7

*4α,8,14-trimethyl-17-oxa-D-homo-18-nor-5α,8α,13α,14β-androstane-3,11,17a-trione*

Three hundred forty-two mg. of 4α,8,14-trimethyl-17-oxa - D - homo - 18 - nor - 5α,8α,9β,13α, 14β - androstane-3,11,17a-trione are added to 35 ml. of a helium blanketed refluxing solution of 5% ethanolic potassium hydroxide. After three hours of reflux under helium, the solution is acidified to pH 3 with 20% sulfuric acid, diluted with water and the solvent is evaporated. The aqueous residue is extracted with ethyl acetate, washed with water until neutral, dried and evaporated to give 328 mg. of 4α,8,14-trimethyl - 17 - oxa-D-homo-18-nor-5α,8α,13α,14β-androstane-3,11,17a-trione. Recrystallization from methanol gives 210 mg., M.P. 206–210° C., which on further recrystallization gives 138 mg., M.P. 207–211° C., $[α]_D^{29}$ —153° C.

*Analysis.*—Calc'd for $C_{21}H_{30}O_4$: C, 72.80; H, 8.73. Found: C, 73.03; H, 8.73.

EXAMPLE 8

*3α-hydroxy-4α,8,14-trimethyl-17-oxa-D-homo-18-nor-5α,8α,13α,14β-androstane-11,17a-dione*

When 3α-acetoxy-4α,8,14-trimethyl-17-oxa-D-homo-18-nor-5α,8α,9β,13α,14β-androstane-11,17a-dione is treated as described in Example 7, there is obtained 3α-hydroxy-4α,8,14 - trimethyl-17-oxa-D-homo-18-nor-5α,8α,13α,14β-androstane-11,17a-dione, which on recrystallization from methanol has M.P. 266–269° C., $[\alpha]_D^{32}$ —179°.

*Analysis.*—Calc'd for $C_{21}H_{32}O_4$: C, 72.38; H, 9.26. Found: C, 72.33; H, 9.33.

EXAMPLE 9

*3α-acetoxy-4α,8,14-trimethyl-17-oxa-D-homo-18-nor-5α,8α,13α,14β-androstane-11,17a-dione*

3α - hydroxy - 4α,8,14 - trimethyl - 17 - oxa - D - homo - 18 - nor - 5α,8α,13α,14β - androstane - 11,17a - dione is acylated with pyridine-acetic anhydride at room temperature to yield 3α - acetoxy - 4α,8,14 - trimethyl - 17 - oxa - D - homo - 18 - nor - 5α,8α,13α,14β - androstane - 11,17a-dione, M.P. 200–201° C., $[\alpha]_D^{32}$ —180°.

*Analysis.*—Calc'd for $C_{23}H_{34}O_5$: C, 72.74; H, 8.78. Found: D, 72.61; H, 8.81.

EXAMPLE 10

*3α,11α-diacetoxy-4α,8,14-trimethyl-17-oxa-D-homo-18-nor-5α,8α,9β,13α,14β-androstane-17a-one*

3α - acetoxy - 11α - hydroxy - 4α,8,14 - trimethyl - 17-oxa - D - homo - 18 - nor - 5α,8α,9β,13α,14β - androstane-17a-one is acylated with a mixture of acetic acid, acetic anhydride and toluene sulfonic acid and allowed to stand at room temperature for twenty minutes to yield 3α,11α-diacetoxy - 4α,8,14 - trimethyl - 17 - oxa - D - homo - 18-nor-5α,8α,9β,13α,14β-androstane-17a-one.

EXAMPLE 11

*3β,11α-diacetoxy-4α,8,14-trimethyl-17-oxa-D-homo-18-nor-5α,8α,9β,13α,14β-androstane-17a-one*

3β, 11α - dihydroxy - 4α,8,14 - trimethyl - 17 - oxa - D-homo - 18 - nor - 5α,8α,9β,13α,14β - androstane - 17a-one is acylated according to the procedure set forth in Example 10 to yield 3β,11α - diacetoxy - 4α,8,14 - trimethyl-17 - oxa - D - homo - 18 - nor - 5α,8α,9β,13α,14β - androstane-17a-one.

EXAMPLE 12

*3β,17aα-dihydroxy-4α,8,14-trimethyl-17-oxa-D-homo-18-nor-5α,8α,13α,14β-androstane-11-one*

A solution of 100 mg. of 4α,8,14-trimethyl-17-oxa-D-homo - 18 - nor - 5α,8α,13α,14β - androstane - 3,11,17a-trione and 100 mg. of sodium borohydride in 10 ml. of absolute ethanol is stirred at room temperature for four hours. After decomposition of excess hydride with glacial acetic acid, the pH is adjusted to 2 with 5% hydrochloric acid and the solvent evaporated. The aqueous residue is extracted with ethyl acetate, which is washed until neutral, dried, and evaporated. Crystallization of the residue from acetone-hexane gives 3β,17aα-dihydroxy-4α,8,14-trimethyl-17-oxa-D-homo-18-nor - 5α,8α,13α,14β-androstane-11-one, M.P. 242–245° C. The analytical sample has M.P. 246–248° C., $[\alpha]_D$ —158° (chloroform).

*Analysis.*—Calc'd for $C_{21}H_{34}O_4$: C, 71.96; H, 9.78. Found: C, 72.03; H, 9.89.

EXAMPLE 13

*3β,17aα-diacetoxy-4α,8,14-trimethyl-17-oxa-D-homo-18-nor-5α,8α,13α,14β-androstane-11-one*

A solution of 105 mg. of 3β,17aα-dihydroxy-4α,8,14-trimethyl-17-oxa-D-homo-18-nor - 5α,8α,13α,14β - androstane-11-one in 2 ml. of pyridine and 1 ml. of acetic anhydride is left at room temperature overnight. The reaction mixture is diluted with water and evaporated. The residue is taken up in ethyl acetate, which is washed with 5% hydrochloric acid and water, dried, and evaporated. Crystallization from methanol gives 54 mg. of 3β,17aα-diacetoxy-4α,8,14-trimethyl-17-oxa - D - homo - 18 - nor-5α,8α,13α,14β - androstane - 11 - one, M.P. 194–197° C. Further recrystallization from methanol gives analytically pure material, M.P. 208–209° C., $[\alpha]_D$ —84° (methanol), —94° (chloroform).

*Analysis.*—Calc'd for $C_{25}H_{38}O_6$: C, 69.09; H, 8.81. Found: C, 69.16; H, 8.82.

EXAMPLE 14

*3β-hydroxy-4α,8,14 - trimethyl-17-oxa-D-homo - 18 - nor-5α,8α,13α,14β-androstane-11,17a-dione*

One hundred mg. of 4α,8,14-trimethyl-17-oxa-D-homo-18-nor-5α,8α,13α,14β-androstane - 3,11,17a - trione and 100 mg. of sodium borohydride are added to 10 ml. of 2.5% ethanolic potassium hydroxide solution and stirred at room temperature for four and one-half hours. The excess borohydride is decomposed with glacial acetic acid, and the solution acidified to pH 2 with 5% hydrochloric acid. The solvent is evaporated and the residue extracted with ethyl acetate, which is washed with saturated sodium chloride solution, dried, and evaporated to give 102 mg. of residue. Recrystallization from methanol gives 46 mg. of 3β-hydroxy-4α,8,14-trimethyl-17-oxa-D-homo-18-nor - 5α,8α,13α,14β - androstane - 11, 17α-dione, M.P. 252–256° C. The analytical sample has M.P. 255–257° C., $[\alpha]_D$ —166° (chloroform).

*Analysis.*—Calc'd for $C_{21}H_{32}O_4$: C, 72.38; H, 9.26. Found: C, 72.53; H, 9.25.

EXAMPLE 15

*3β-acetoxy-4α,8,14 - trimethyl-17-oxa-D-homo-18-nor-5α-8α,13α,17β-androstane-11,17a-dione*

A solution of 51 mg. of 3β-hydroxy-4α,8,14-trimethyl-17-oxa-D-homo-18-nor - 5α,8α,13α,14β - androstane - 11, 17a-dione in 1 ml. of pyridine and 0.5 ml. of acetic anhydride is left overnight at room temperature. After addition of water the solution is evaporated to give 55 mg. of 3β-acetoxy-4α,8,14-trimethyl-17-oxa-D-homo-18-nor-5α,8α,13α,14β-androstane - 11,17a - dione. Two recrystallizations from methanol give analytically pure material, M.P. 287–290° C. (in vacuo), $[\alpha]_D$ —131° (chloroform).

*Analysis.*—Calc'd for $C_{23}H_{34}O_5$: C, 70.74; H, 8.78. Found: C, 70.67; H, 8.73.

While there have been described various embodiments of the invention, the compositions and methods described are not intended to be understood as limiting the scope of the invention, as it is realized that changes therein are possible and it is further intended that each element recited in any of the following claims is to be understood as referring to all equivalents for accomplishing substantially the same results in substantially the same or equivalent manner, it covering the invention broadly in whatever form its principle may be utilized.

What is claimed is:

1. A compound having the formula

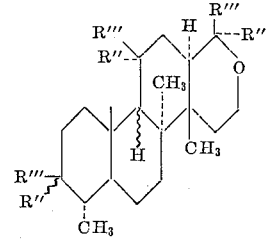

wherein R''' is hydrogen; R'' is hydroxy or the acyloxy radical of a hydrocarbon carboxylic acid of less than twelve carbon atoms; and together R'' and R''' is oxo (O=).

2. A compound in accordance with the formula of claim 1 having the name 3α-acetoxy-11α-hydroxy-4α,8,14-trimethyl-17-oxa-D-homo-18 - nor - 5α,8α,9β,13α,14β-androstane-17a-one.

3. A compound in accordance with the formula of claim 1 having the name 3α-acetoxy-4α,8,14-trimethyl-17-oxa-D-homo-18-nor-5α,8β,9α,13α,14β - androstane-11,17a-dione.

4. A compound in accordance with the formula of claim 1 having the name 3β,11α-dihydroxy-4α,8,14-trimethyl-17-oxa-D-homo-18-nor-5α,8α,9β,13α,14β - androstane-17a-one.

5. A compound in accordance with the formula of claim 1 having the name 4α,8,14-trimethyl-17-oxa-D-homo-18-nor-5α,8α,9β,13α,14β - androstane-3,11,17a-trione.

6. A compound in accordance with the formula of claim 1 having the name 3α,11α-dihydroxy-4α,8,14-trimethyl-17-oxa-D-homo-17-nor-5α,8α,9β,13α,14β - androstane-17a-one.

7. A compound in accordance with the formula of claim 1 having the name 4α,8,14-trimethyl-17-oxa-D-homo-18-nor-5α,8α,13α,14β - androstane-3,11,17a-trione.

8. A compound in accordance with the formula of claim 1 having the name 3α-hydroxy-4α,8,14-trimethyl-17-oxa-D-homo-18 - nor - 5α,8α,13α,14β - androstane-11,17a-dione.

9. A compound in accordance with the formula of claim 1 having the name 3α-acetoxy-4α,8,14-trimethyl-17-oxa-D-homo-18-nor - 5α,8α,13α,14β - androstane - 11,17a-dione.

10. A compound in accordance with the formula of claim 1 having the name 3α,11α-diacetoxy-4α,8,14-trimethyl-17-oxa-D-homo-18-nor-5α,8α,9β,13α,14β - androstane-17a-one.

11. A compound in accordance with the formula of claim 1 having the name 3β,11α-diacetoxy-4α,8,14-trimethyl-17-oxa-D-homo-18-nor-5α,8α,9β,13α,14β - androstane-17a-one.

12. A compound in accordance with the formula of claim 1 having the name 3β,17aα-dihydroxy-4α,8,14-trimethyl-17-oxa-D-homo-18 - nor - 5α,8α,13α,14β - androstane-11-one.

13. A compound in accordance with the formula of claim 1 having the name 3β,17aα-diacetoxy-4α,8,14-trimethyl-17-oxa-D-homo - 18-nor - 5α,8α,13α,14β - androstane-11-one.

14. A compound in accordance with the formula of claim 1 having the name 3β-hydroxy-4α,8,14-trimethyl-17-oxa-D-homo-18-nor - 5α,8α,13α,14β - androstane - 11,17a-dione.

15. A compound in accordance with the formula of claim 1 having the name 3β-acetoxy-4α,8,14-trimethyl-17-oxa-D-homo-18-nor - 5α,8α,13α,17β - androstane - 11,17a-dione.

References Cited by the Examiner

Krakower and Schwartz: American Chemical Soc., abstracts of papers (April 4, 1965), page 20P.

WALTER A. MODANCE, *Primary Examiner.*

JAMES A. PATTEN, *Assistant Examiner.*